US008180771B2

(12) United States Patent
Leeds et al.

(10) Patent No.: US 8,180,771 B2
(45) Date of Patent: May 15, 2012

(54) SEARCH ACTIVITY ERASER

(75) Inventors: Douglas D. Leeds, Danville, CA (US); Erik T. Collier, Livermore, CA (US)

(73) Assignee: IAC Search & Media, Inc., Oakland, CA (US)

( * ) Notice: Subject to any disclaimer, the term of this patent is extended or adjusted under 35 U.S.C. 154(b) by 401 days.

(21) Appl. No.: 12/176,291

(22) Filed: Jul. 18, 2008

(65) Prior Publication Data
US 2010/0017414 A1    Jan. 21, 2010

(51) Int. Cl.
*G06F 17/30* (2006.01)
(52) U.S. Cl. ........ 707/732; 707/721; 707/705; 707/733; 707/734
(58) Field of Classification Search ................... 707/705, 707/706, 721, 732, 733, 734
See application file for complete search history.

(56) References Cited

U.S. PATENT DOCUMENTS

| | | |
|---|---|---|
| 5,845,278 A | 12/1998 | Kirsch et al. |
| 5,963,940 A | 10/1999 | Liddy et al. |
| 5,966,695 A | 10/1999 | Melchione et al. |
| 5,966,710 A | 10/1999 | Burrows |
| 5,983,216 A | 11/1999 | Kirsch et al. |
| 5,987,446 A | 11/1999 | Corey et al. |
| 6,009,459 A | 12/1999 | Belfiore et al. |
| 6,018,733 A | 1/2000 | Kirsch et al. |
| 6,026,388 A | 2/2000 | Liddy et al. |
| 6,026,391 A | 2/2000 | Osborn et al. |
| 6,029,195 A | 2/2000 | Herz |
| 6,038,561 A | 3/2000 | Snyder et al. |
| 6,067,539 A | 5/2000 | Cohen |
| 6,145,003 A | 11/2000 | Sanu et al. |
| 6,178,416 B1 | 1/2001 | Thompson et al. |
| 6,182,068 B1 | 1/2001 | Culliss |
| 6,185,558 B1 | 2/2001 | Bowman et al. |
| 6,208,988 B1 | 3/2001 | Schultz |
| 6,223,215 B1 | 4/2001 | Hunt et al. |
| 6,269,368 B1 | 7/2001 | Diamond |
| 6,269,394 B1 | 7/2001 | Kenner et al. |
| 6,321,228 B1 | 11/2001 | Crandall et al. |
| 6,347,313 B1 | 2/2002 | Ma et al. |
| 6,370,527 B1 | 4/2002 | Singhal |

(Continued)

FOREIGN PATENT DOCUMENTS
GB    2378789    2/2003
(Continued)

OTHER PUBLICATIONS

PCT International Search Report, International Application No. PCT/US04/41252; International Filing Date, Dec. 7, 2004; mailing date, Jan. 20, 2006 (5 pp.).

(Continued)

*Primary Examiner* — Rehana Perveen
*Assistant Examiner* — Tiffany Thuy Bui
(74) *Attorney, Agent, or Firm* — Stephen M. De Klerk

(57) ABSTRACT

A system and method of data processing receives a query at a server computer system. The system and method utilizes the query to extract a search result from a data source. The system and method receives at least one search activity record and a user preference from a client computer system over a network at a server computer system. The server computer system stores at least one search activity record on the server computer system and deletes the at least one search activity record on the server computer system based on the user preference.

11 Claims, 12 Drawing Sheets

U.S. PATENT DOCUMENTS

| | | |
|---|---|---|
| 6,401,084 B1 | 6/2002 | Ortega et al. |
| 6,401,118 B1 | 6/2002 | Thomas |
| 6,421,675 B1 | 7/2002 | Ryan et al. |
| 6,424,966 B1 | 7/2002 | Meyerzon et al. |
| 6,438,579 B1 | 8/2002 | Hosken |
| 6,446,035 B1 | 9/2002 | Grefenstette et al. |
| 6,480,837 B1 | 11/2002 | Dutta |
| 6,480,843 B2 | 11/2002 | Li |
| 6,480,894 B1 | 11/2002 | Courts et al. |
| 6,490,577 B1 | 12/2002 | Anwar |
| 6,545,209 B1 | 4/2003 | Flannery et al. |
| 6,546,388 B1 | 4/2003 | Edlund et al. |
| 6,578,025 B1 | 6/2003 | Pollack et al. |
| 6,606,657 B1 | 8/2003 | Zilberstein et al. |
| 6,631,369 B1 | 10/2003 | Meyerzon et al. |
| 6,633,867 B1 | 10/2003 | Kraft et al. |
| 6,678,611 B2 | 1/2004 | Khavakh et al. |
| 6,718,324 B2 | 4/2004 | Edlund et al. |
| 6,735,518 B2 | 5/2004 | Kim |
| 6,757,661 B1 | 6/2004 | Blaser et al. |
| 6,785,671 B1 | 8/2004 | Bailey et al. |
| 6,785,683 B1 | 8/2004 | Zodik et al. |
| 6,832,218 B1 | 12/2004 | Emens et al. |
| 6,847,969 B1 | 1/2005 | Mathai et al. |
| 6,886,009 B2 | 4/2005 | Jeng et al. |
| 6,901,411 B2 | 5/2005 | Li et al. |
| 6,915,204 B1 | 7/2005 | Heideman |
| 6,920,448 B2 | 7/2005 | Kincaid et al. |
| 6,957,226 B2 | 10/2005 | Attias |
| 6,957,390 B2 | 10/2005 | Tamir et al. |
| 6,963,867 B2 | 11/2005 | Ford et al. |
| 6,965,900 B2 | 11/2005 | Srinivasa et al. |
| 6,969,763 B1 | 11/2005 | Ecker et al. |
| 6,974,860 B2 | 12/2005 | Quirk |
| 7,003,517 B1 | 2/2006 | Seibel et al. |
| 7,013,238 B1 | 3/2006 | Weare |
| 7,047,502 B2 | 5/2006 | Petropoulos et al. |
| 7,080,073 B1 | 7/2006 | Jiang et al. |
| 7,082,573 B2 | 7/2006 | Apparao et al. |
| 7,152,061 B2 | 12/2006 | Curtis et al. |
| 7,158,878 B2 | 1/2007 | Rasmussen et al. |
| 7,181,447 B2 | 2/2007 | Curtis et al. |
| 7,373,244 B2 | 5/2008 | Kreft |
| 7,451,131 B2 | 11/2008 | Curtis et al. |
| 7,523,099 B1 | 4/2009 | Egnor et al. |
| 7,620,496 B2 | 11/2009 | Rasmussen |
| 7,634,463 B1 | 12/2009 | Katragadda et al. |
| 7,739,274 B2 | 6/2010 | Curtis et al. |
| 7,925,789 B2 * | 4/2011 | Li ............................... 709/246 |
| 2001/0053999 A1 | 12/2001 | Feinberg |
| 2002/0065802 A1 | 5/2002 | Uchiyama |
| 2002/0078035 A1 | 6/2002 | Frank et al. |
| 2002/0147724 A1 | 10/2002 | Fries et al. |
| 2003/0004995 A1 | 1/2003 | Novaes |
| 2003/0011629 A1 | 1/2003 | Rouse et al. |
| 2003/0069877 A1 | 4/2003 | Grefenstette et al. |
| 2003/0154196 A1 | 8/2003 | Goodwin et al. |
| 2003/0220844 A1 | 11/2003 | Marnellos et al. |
| 2003/0225885 A1 | 12/2003 | Rochberger et al. |
| 2003/0236771 A1 | 12/2003 | Becker |
| 2004/0249796 A1 | 12/2004 | Azzam |
| 2004/0249801 A1 | 12/2004 | Kapur |
| 2004/0260677 A1 | 12/2004 | Malpani et al. |
| 2005/0033803 A1 | 2/2005 | Vleet et al. |
| 2005/0060289 A1 | 3/2005 | Keenan et al. |
| 2005/0060290 A1 | 3/2005 | Herscovivi et al. |
| 2005/0071328 A1 | 3/2005 | Lawrence |
| 2005/0097089 A1 | 5/2005 | Nielsen et al. |
| 2005/0120045 A1 | 6/2005 | Klawon |
| 2005/0165753 A1 | 7/2005 | Chen |
| 2005/0228780 A1 * | 10/2005 | Diab et al. ........................ 707/3 |
| 2005/0270311 A1 | 12/2005 | Rasmussen et al. |
| 2006/0004716 A1 * | 1/2006 | Hurst-Hiller et al. ............. 707/3 |
| 2006/0026170 A1 | 2/2006 | Kreitler et al. |
| 2006/0100956 A1 | 5/2006 | Ryan et al. |
| 2006/0112081 A1 * | 5/2006 | Qureshi ........................ 707/3 |
| 2006/0173617 A1 | 8/2006 | Sladky et al. |
| 2006/0206264 A1 | 9/2006 | Rasmussen |
| 2006/0206454 A1 | 9/2006 | Forstall et al. |
| 2006/0223509 A1 | 10/2006 | Fukazawa et al. |
| 2006/0224574 A1 | 10/2006 | Dettinger et al. |
| 2006/0230040 A1 | 10/2006 | Curtis et al. |
| 2006/0271280 A1 | 11/2006 | O'Clair |
| 2006/0271287 A1 | 11/2006 | Gold et al. |
| 2006/0271531 A1 | 11/2006 | O'Clair et al. |
| 2007/0060114 A1 | 3/2007 | Ramer et al. |
| 2007/0088616 A1 | 4/2007 | Lambert et al. |
| 2007/0094042 A1 | 4/2007 | Ramer |
| 2007/0118512 A1 | 5/2007 | Riley et al. |
| 2007/0174244 A1 * | 7/2007 | Jones ............................... 707/3 |
| 2007/0214454 A1 | 9/2007 | Edwards et al. |
| 2007/0283287 A1 | 12/2007 | Taylor et al. |
| 2007/0294233 A1 | 12/2007 | Sheu et al. |
| 2008/0005104 A1 | 1/2008 | Flake et al. |
| 2008/0005668 A1 | 1/2008 | Mavinkurve et al. |
| 2008/0040678 A1 | 2/2008 | Crump |
| 2008/0082578 A1 | 4/2008 | Hogue et al. |
| 2008/0104530 A1 | 5/2008 | Santanche et al. |
| 2008/0133124 A1 | 6/2008 | Sarkeshik |
| 2008/0140603 A1 | 6/2008 | Babikov et al. |
| 2008/0208824 A1 | 8/2008 | Curtis et al. |
| 2008/0208825 A1 | 8/2008 | Curtis et al. |
| 2008/0222119 A1 | 9/2008 | Dai et al. |
| 2008/0222132 A1 * | 9/2008 | Pan et al. ........................ 707/5 |
| 2008/0235189 A1 | 9/2008 | Rayman et al. |
| 2008/0235623 A1 * | 9/2008 | Li ................................. 715/817 |
| 2008/0243783 A1 | 10/2008 | Santi et al. |
| 2008/0281776 A1 | 11/2008 | Goradia |
| 2008/0281806 A1 | 11/2008 | Wang et al. |
| 2008/0281821 A1 | 11/2008 | Chen et al. |
| 2008/0292213 A1 | 11/2008 | Chau |
| 2008/0307333 A1 * | 12/2008 | McInerney et al. ........... 707/204 |
| 2009/0006082 A1 * | 1/2009 | Harris et al. .................. 704/201 |
| 2009/0006169 A1 | 1/2009 | Wetzer et al. |
| 2009/0063452 A1 * | 3/2009 | Ahn et al. ........................ 707/5 |
| 2009/0094223 A1 | 4/2009 | Berk et al. |
| 2009/0132929 A1 | 5/2009 | Reed, Jr. et al. |
| 2009/0183097 A1 | 7/2009 | Bayiates |
| 2010/0023392 A1 | 1/2010 | Merriman et al. |
| 2010/0030735 A1 | 2/2010 | Curtis et al. |
| 2010/0082634 A1 | 4/2010 | Leban |
| 2010/0138400 A1 | 6/2010 | Curtis et al. |

FOREIGN PATENT DOCUMENTS

| | | |
|---|---|---|
| JP | 09-153060 | 6/1997 |
| JP | 2006-236699 | 8/2002 |
| JP | 2002-318801 | 10/2002 |
| JP | 2003-167852 | 6/2003 |
| WO | WO 00/31625 | 6/2000 |
| WO | WO 01/18665 | 3/2001 |
| WO | WO 2004/114162 | 12/2004 |

OTHER PUBLICATIONS

PCT International Search Report, International Application No. PCT/US04/41254; International Filing Date, Dec. 7, 2004; mailing date, Jan. 11, 2006 (3 pp.).

PCT International Search Report, International Application No. PCT/US04/41255; International Filing Date, Dec. 7, 2004; mailing date, Apr. 12, 2006 (4 pp.).

PCT International Search Report, International Application No. PCT/USO4/41089; International Filing Date, Dec. 7, 2004; mailing date, Nov. 1, 2005 (3 pp.).

International Preliminary Report on Patentability, Internation Application No. PCT/US04/41089; International Filing Date, Dec. 7, 2004; mailing date, Apr. 27, 2006 (6 pp.).

Russell, Ed. J., "Discovering the information model", Institute of Electrical and Electronics Engineers—International Professional Communication Conference Proceedings, IPCC 2001, Santa Fe, NM, Oct. 24-27, 2001, pp. 121-134, New York, NY.

Bookstein, Abraham et al., "Model Based Concordance Compression," Data Electronics Engineers—International Professional Communication Conference Proceedings, IPCC 2001, Santa Fe, NM, Oct. 24-27, 2001, pp. 121-134, New York, NY>Y.

Ravela, S. et al., "Image Retrieval Appearance," ACM SIGIR 1997, pp. 278-285.

Buykkokten, et al, "Exploiting geographic location information of web pages," Feb. 5, 2005 [retrieved Jul. 1, 2008]. <<Http://webarchive.org/web/2005020500116/http://web-db.stanford.edu/~orkut/papers/geog.pdf, pp. 1-4>>.

Oren, Erik Selberg, "The Metacrawler Architecture for Resource Aggregation on the Web," 1997, IEEE Expert, v. 12, pp. 8-14.

* cited by examiner

SEARCH ACTIVITY ERASER

CROSS-REFERENCE TO RELATED APPLICATIONS

This application is related to U.S. patent application Ser. No. 12/111,065 entitled "SEARCH CUSTOMIZATION BY GEO-LOCATED PROXY OF USER SEGMENT" by Levin, et al., filed on Apr. 28, 2008, which is hereby incorporated herein by reference.

This application is also related to U.S. patent application Ser. No. 10/853,552 (now U.S. Pat. No. 7,181,447) entitled "METHODS AND SYSTEMS FOR CONCEPTUALLY ORGANIZING AND PRESENTING INFORMATION," by Curtis, et al., filed on May 24, 2004, which is hereby incorporated herein by reference.

BACKGROUND OF THE INVENTION

1). Field of the Invention

Embodiments of this invention relate to a data processing system and method that erases search activity data.

2). Discussion of Related Art

The internet is a global network of computer systems and has become a ubiquitous tool for finding information regarding news, businesses, events, media, etc. based on a user search criteria. A user can interact with the internet through a user interface that is typically stored on a server computer system.

Because of increased user activity on the Internet and sophisticated tracking methods, more behavioral information concerning a user is being recorded through the internet. Unfortunately, a user's personal information can be abused and thus raises serious privacy concerns about retaining such information.

Often times, a user's internet activity is recorded on a remote computer. For example, a user searching for a specific product may click on various search results which are subsequently recorded by a server computer system. The recorded information may be later utilized for commercial purposes against the user's will. Providing search results while also respecting a user's privacy could alleviate privacy concerns in the search industry and result in a more enjoyable user experience.

SUMMARY OF THE INVENTION

The invention provides a method of data processing including receiving at least one search activity record and a user preference from a client computer system over a network at a server computer system.

The method of data processing may further include storing at least one search activity record on the server computer system and deleting the at least one search activity record on the server computer system based on the user preference.

The method of data processing may further include the at least one search activity record being at least one search query that is received at a search engine which extracts at least one search result from a data source and transmits the at least one search result from the server computer system to the client computer system.

The method of data processing may further include the at least one search activity record being at least one of an IP address, a user ID, a session ID cookie, and user pick data.

The method of data processing may further include the at least one search activity record being deleted from the server computer system before the at least one search activity record can be used to derive additional information.

The method of data processing may further include the additional information being information that is related to a user pick pattern or user search pattern.

The method of data processing may further include retaining user provided personal information on the server computer system after the at least one search activity record is deleted from the server computer system.

The method of data processing may further include storing an eraser identification cookie on the client computer system that represents the user preference. The eraser identification cookie indicates whether the at least one search activity record is to be deleted from the server computer system.

The method of data processing may further include the eraser identification cookie being user modifiable to allow or prevent the deletion of the at least one search activity record from the server computer system.

The method of data processing may further include storing an unfiltered results cookie that identifies whether the user is capable of viewing unfiltered search results.

The invention provides a machine-readable storage medium that provides executable instructions which, when executed by a computer system, cause the computer system to perform a method.

In the machine-readable storage medium, the computer system may execute the method including receiving at least one search activity record and a user preference from a client computer system over a network at a server computer system and storing at least one search activity record on the server computer system. In addition, the method may further include deleting the at least one search activity record on the server computer system based on the user preference.

In the machine-readable storage medium, the computer system may execute the method further including receiving the at least one search query at a search engine and extracting at least one search result from a data source and transmitting the at least one search result from the server computer system to the client computer system.

In the machine-readable storage medium, the computer system may execute the method further including the at least one search activity record being at least one of an IP address, a user ID, a session ID cookie, and user pick data.

In the machine-readable storage medium, the computer system may execute the method further including the at least one search activity record being deleted from the server computer system before the at least one search activity record can be used to derive additional information.

In the machine-readable storage medium, the computer system may execute the method further including the additional information being information that is related to a user pick pattern or user search pattern.

In the machine-readable storage medium, the computer system may execute the method further including retaining user provided personal information on the server computer system after the at least one search activity record is deleted from the server computer system.

In the machine-readable storage medium, the computer system may execute the method further including storing an identification cookie on the client computer system that represents the user preference. The eraser identification cookie indicates whether the at least one search activity record is to be deleted from the server computer system.

In the machine-readable storage medium, the computer system may execute the method further including the eraser identification cookie being user modifiable to allow or prevent the deletion of the at least one search activity record from the server computer system.

In the machine-readable storage medium, the computer system may execute the method further including storing an unfiltered results cookie that identifies whether the user is capable of viewing unfiltered search results.

The invention provides a system for processing data including a server computer system and a module stored on the server computer system for receiving a search activity record and a user preference.

The system for data processing may further include a data store to store at least one search activity record on the server computer system and a deleting module to delete the at least one search activity record on the data store based on the user preference.

The system for data processing may further include at least one search activity record is at least one search query and a search engine that utilizes the query to extract at least one search result from a data source. The system may further include a transmission module to transmit the at least one search result from the server computer system to the client computer system.

The system for data processing may further include at least one search activity record being at least one of an IP address, a user ID, a session ID cookie, and user pick data.

BRIEF DESCRIPTION OF THE DRAWINGS

The invention is further described by way of example with reference to the accompanying drawings, wherein.

DETAILED DESCRIPTION OF THE INVENTION

Figure 1:
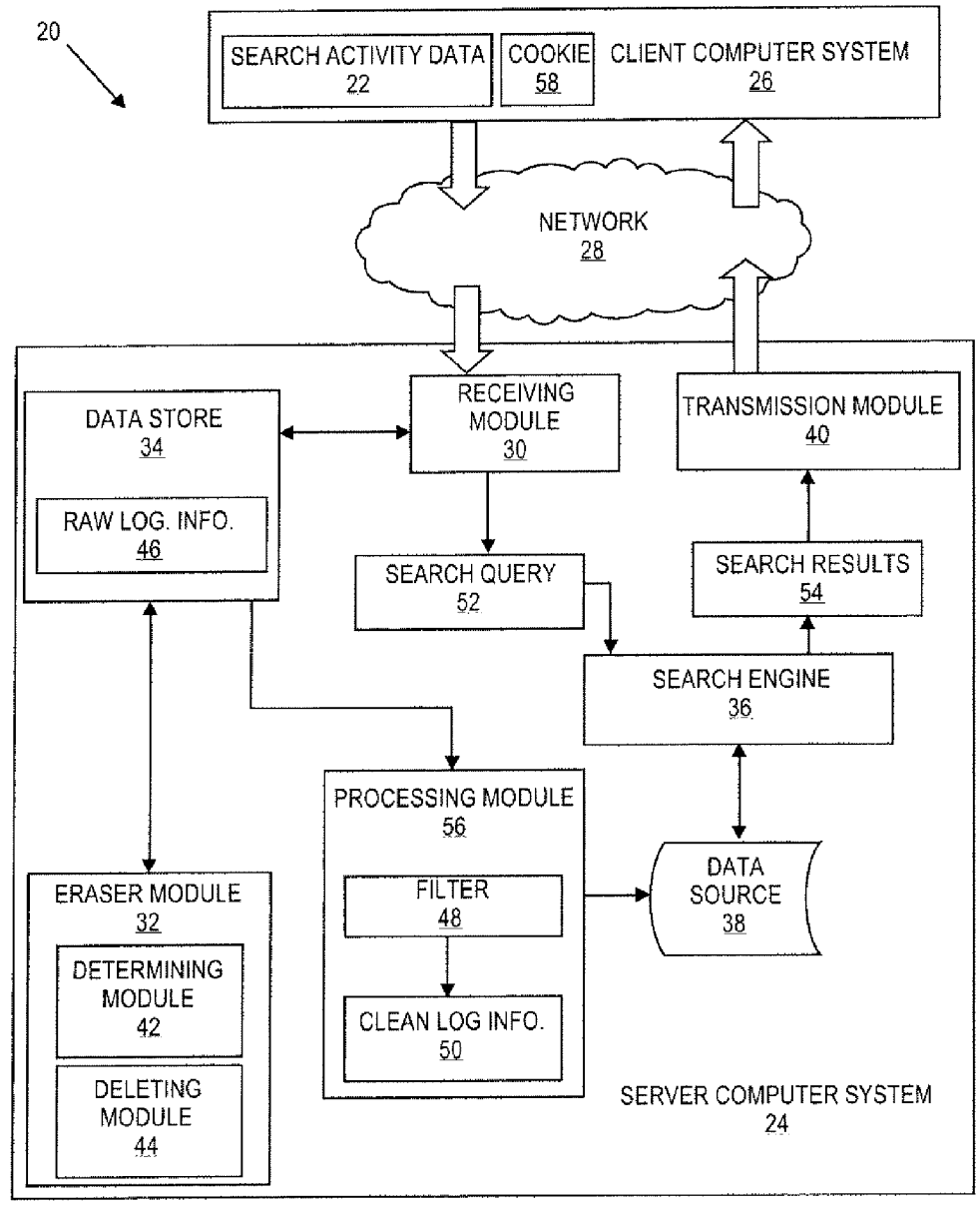
FIG. 1 is a block diagram illustrating a data processing system.

FIG. 1 of the accompanying drawings illustrates a data processing system 20 that includes a server computer system 24, a client computer system 26, and a network 28, according to an embodiment of the invention.

The client computer system 26 includes search activity data 22 and a cookie 58. The client computer system 26 and server computer system 24 are connected through the network 28.

The server computer system 24 includes a receiving module 30, a data store 34, an eraser module 32, a processing module 56, a data source or database 38, a search engine 36, and a transmission module 40.

The receiving module 30 is connected with the data store 34, search engine 36, and network 28. The receiving module 30 receives search activity data 22 from the client computer system 26 through the network 28.

The data store 34 is connected with the receiving module 30, an eraser module 32, and a processing module 56. The data store 34 includes raw log information 46 which contains recorded query search terms, user picks such as clicked links, IP addresses, user identifiers and session identifiers. It is understood that the raw log information 46 can contain any information related to user search activity data 22.

Raw log information 46 includes recorded user interactions with the search engine 36 and user interface. The raw log information 46 is a record of user picks or clicks on links of a web page (what the user clicked on), search queries (what the user searched for), Internet Protocol address (hereinafter, "IP address") information (where the user is searching from), and user or session IDs (who the user is in relation to other searches). Client computer system 26 activity can be continuously or non-continuously recorded as raw log information 46 by the data store 34.

FIG. 1 further shows the processing module 56 being connected with the data store 34 and a data source 38. At least certain embodiments of the invention involve the data store 34 and data source 38 being separate sources of data. The following description is directed to a server computer system 24 having a separate data store 34 and data source 38, but it will be understood that the following description is merely one example of an embodiment of the invention, and that other examples of other embodiments may have the data store 34 and data source 38 as an integral source of data. The processing module 56 includes a filter 48 and clean log information 50.

The eraser module 32 includes a determining module 42 and a deleting module 44. The eraser module 32 is connected with the data store 34 so that information can be transmitted and received between the eraser module 32 and data store 34.

The search engine 36 is connected with the receiving module 30 to receive a search query 52 from the client computer system 26 and is further connected with a transmission module 40. Moreover, the data source 38 is further connected with the search engine 36 so that the search engine 36 can transmit and receive information with the data source 38 to search for a search result 54 based on a search query 52. The search engine 36 can be of the type described in U.S. application Ser. No. 10/853,552, the contents of which are hereby incorporated by reference.

A transmission module 40 is connected with the search engine 36 and the network 28 to transmit search results 54 from the search engine 36 to the client computer system 26.

Figure 2:
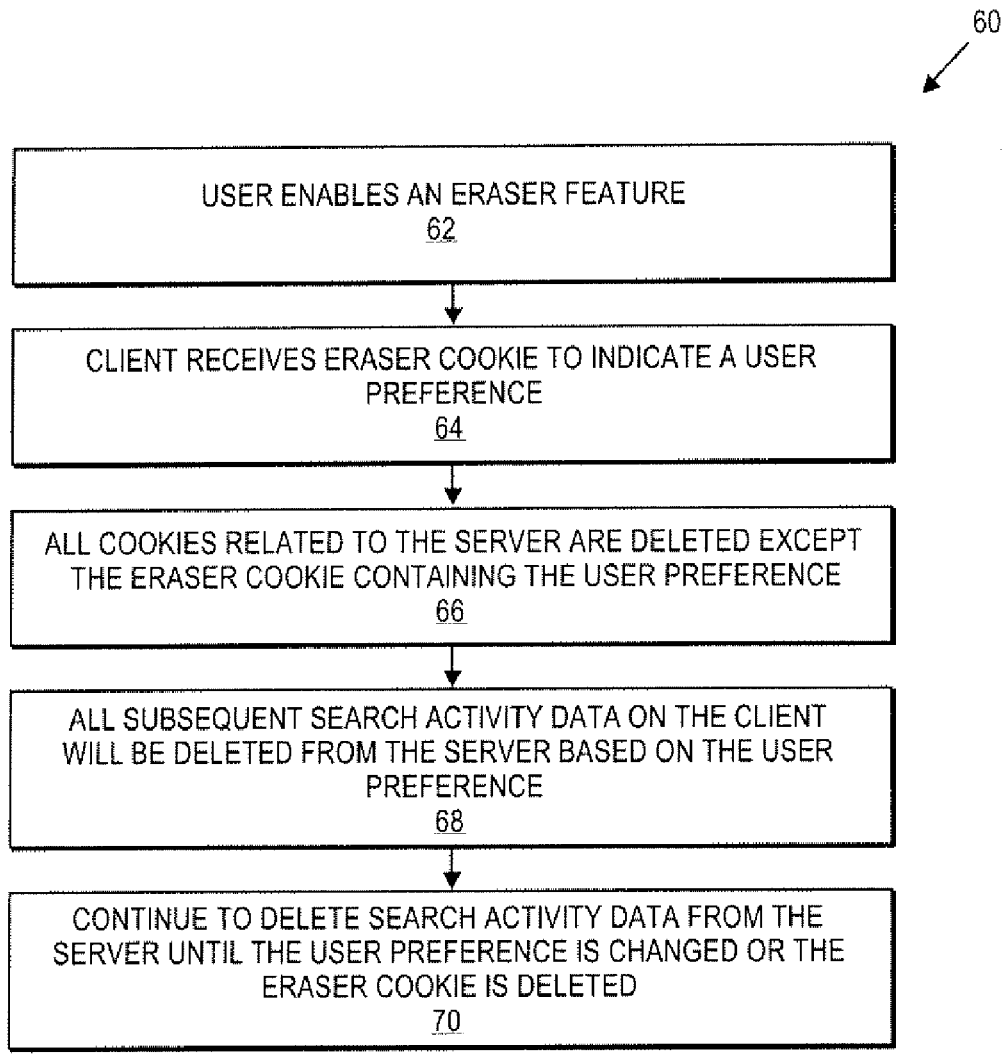
FIG. 2 is a flowchart illustrating a search activity erasing method.

In use, FIG. 2 illustrates a block diagram of a method 60 for a user on the client computer system 26 to set a user preference in order to have search activity data 22 deleted from a server computer system 24.

Search activity data 22 is generated on the client computer system 26 and is received by the receiving module 30. Search activity data 22 is any general input related to information searching over a network. The search activity data 22 can be an internet search query 52 received from the client computer system 26. However, the query is not necessarily a search query but may be words extracted from a web document or stored document.

Furthermore, the search activity data 22 includes any user pick, click data, or user input related to a Uniform Resource Locator (hereinafter, "URL") link. The user pick data or input can be a user mouse click, input, or selection of a search result 54, web link, advertising link, or any trackable user interaction with a web browser representing the will of the user.

In addition, the search activity data 22 includes additional data related to a client computer's IP address, user IDs, and session IDs. Moreover, the search activity data 22 can alternatively further include timestamp information related to the time and day a user entered a certain query or selected a certain search result.

FIG. 2 shows various operations where the user enables 62 an eraser feature by selecting an option button or text using a point and click device. Alternatively, the eraser feature is enabled by keystrokes, voice recognition, touch sensitive selection, or any known means of selecting an option.

Upon enabling the eraser feature, the client computer system 26 receives 64 an "Eraser" cookie 58 file configured to indicate a user preference. The cookie 58 is initially obtained from the server computer system 24 but can alternatively be obtained from a third-party. Generally, a cookie is a piece of text that a server can store on a client data store. In general, cookies include text containing name-value pairs for purposes of identifying a specific user or search characteristics.

In one example, a cookie file having the name "cookie: user_name@ask.com/" is stored on the client computer system 26. With the eraser feature selected by the user, the Eraser cookie 58 file contains the following information:

askeraser
on
ask.com/
1536337552998432108321312136256299296145
*

As shown in the above example, the Eraser cookie 58 simply shows the title of the cookie and the domain name from which the cookie was created. In the example, the domain "ask.com" has created the Eraser cookie named "askeraser". Most importantly, the Eraser cookie 58 contains no other significant identification or search activity data 22 except for the simple text "on" which indicates that the eraser feature is enabled by the user as a user preference. In the example above, the "askeraser" cookie is set to expire after 30 years although it is understood that any expiration time may be selected.

The Eraser cookie 58 is the only cookie from the server computer system 24 that is present on the client computer system 26 when the eraser feature is enabled. Furthermore, when the eraser feature is enabled, all other cookies previously received from the server computer system 24 are deleted 66 except the Eraser cookie 58 containing the indication of the user preference. The Eraser cookie 58 acts as a constant indicator to client and server computer systems for determining whether a user has turned on or enabled the eraser feature.

Furthermore, third-party cookies are suppressed when the eraser feature is enabled. New third party cookies cannot be placed on the client computer system 26 and third party cookies that already reside on the client computer system 26 cannot gather information about the search activity being conducted. However, third parties can still receive search query information through referrer data.

When the eraser feature is enabled, all subsequent search activity data 22 will be deleted 68 from the server computer system 24. The eraser module 32 will continue 70 to delete search activity data 22 from the data store 34 until the user preference in the Eraser cookie is changed or the Eraser cookie 58 is deleted from the client computer system.

In another example, the eraser feature is turned off and the cookie text is modified to contain the following information:
tbe
1
ask.com/
15364074387456300030392051766256299296145
*
accepting
1
ask.com/
15364074387456300030392051766256299296145
*
wz_uid
0C41872A2E2D76B514C4ED556D9D130F
ask.com/
15361815711360300764652061456256299296145
*
wz_sid
014B802B2D2D76B514C4ED556D9D130F
ask.com/
15362878227072299296182061456256299296145
*
wz_scnt
1
ask.com/
15361815711360300764652061456256299296145
*

As shown in the exemplary cookie text above, the text "on" is no longer present. Instead, the text "accepting" is provided along with other name-value pair information indicating the user ID, session ID and other search activity data 22. In the above example, the server computer system 24 stores search activity data 22 in the data store 34 as raw log information 46. Because the cookie text does not indicate a user preference to enable the eraser feature, an unlimited number of cookies from the server computer system 24 may be stored on the client computer system 26. In addition, the eraser module 32 is not enabled and does not erase search activity data 22 from the data store 34, as discussed in further detail below.

Figure 3:
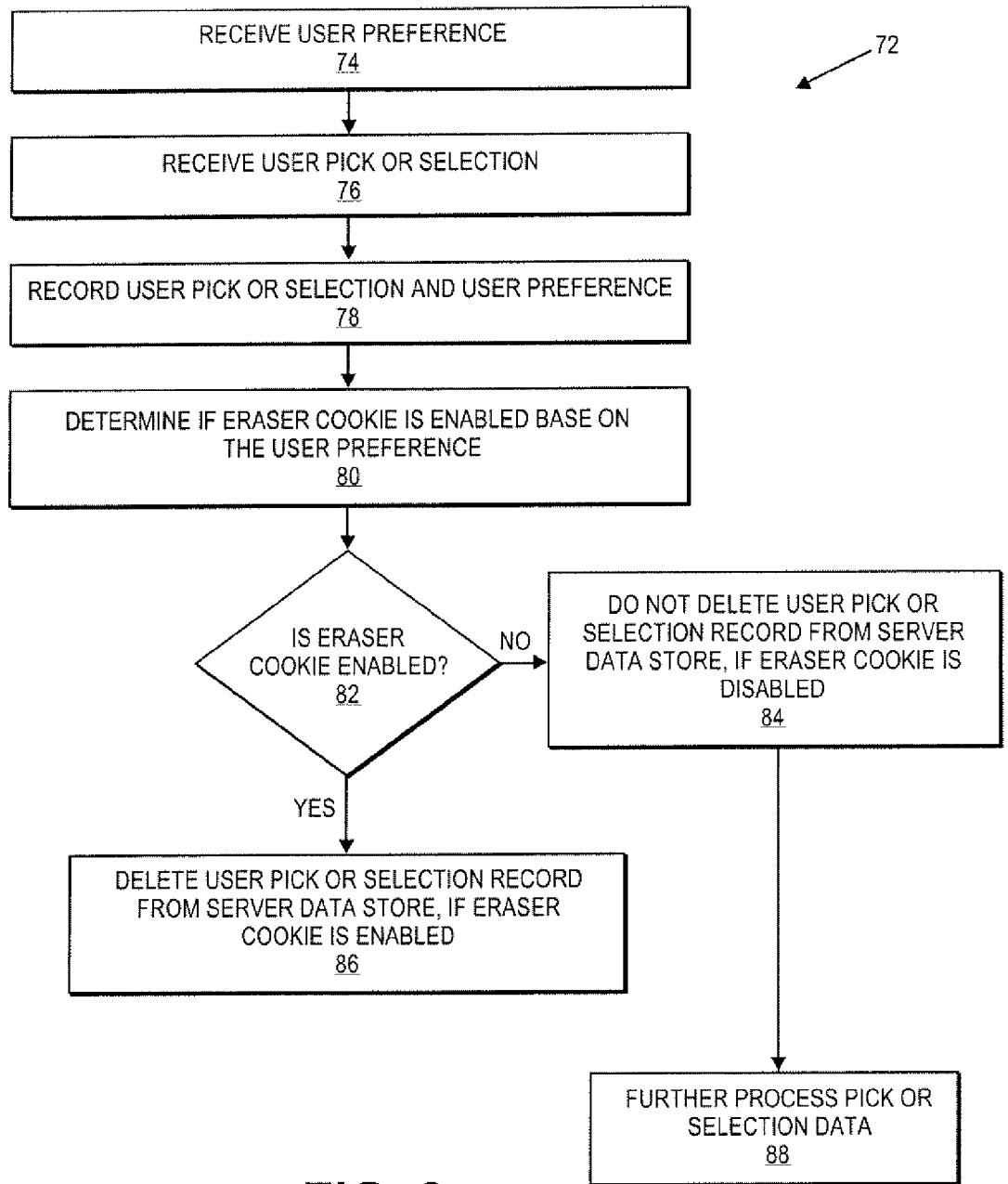
FIG. 3 is a flowchart illustrating a pick erasing method.

FIG. 3 illustrates various data processing system 20 operations that occur when a user clicks or selects a web link or search result 54. The receiving module 30 receives 74 a user preference based on the cookie 58 and further receives 76 information related to a user click or pick 22. The receiving module 30 records the user click or selection 22 and a user preference as raw log information 46 on the data store 34.

The determining module 42 determines 80,82 whether certain raw log information 46 was received while the Eraser cookie 58 was enabled (enabling the eraser feature) based on the user preference. If the eraser feature is enabled, the deleting module 44 of the eraser module 32 will delete 86 from the data store 34 all search activity data 22 received while the eraser feature is enabled.

However, if the eraser feature is not enabled, the deleting module 44 will not delete search activity data 22 that was received by the server computer system 24 when the eraser feature was not enabled. For example, searches, user clicks or picks, and search activity 22 previously conducted when the eraser feature was not enabled will not be deleted as will be discussed in further detail.

Furthermore, the deleting module 44 does not delete personally identifiable information including names and e-mail addresses that a user voluntarily provides to the server computer system 24.

In one example, a website contains a personal folder (named "MyStuff", for example) where a user may click and login with a personal email or user name. While the user is logged in, the personal folder allows the user to track recently conducted searches, saved results, and create special folders and tags for the user's own personal use and reference.

If the user enables the eraser feature, the content within the personal folder is not affected. However, the tracking ability of the personal folder is disabled while the eraser feature is enabled.

It should be noted that while the eraser feature is enabled, the deleting module will not immediately delete search activity data 22 on the server computer system 24 for various reasons. In one example, the search activity 22 is not deleted immediately in order to run automated systems to detect and block users or automatic bots that abuse the server computer system 24.

In another example, the search activity data 22 is not deleted at all (even though the eraser feature is enabled) in order to solve a critical technical issue emanating from internal sources (instability, etc.), or external sources (denial-of-service attack, etc.). Additionally, the search activity data 22 is not deleted if search activity data 22 must be retained on the server computer system 24 due to legal obligations.

FIG. 3 shows that user click or pick information is not deleted 84 from the server data store 34 if the Eraser cookie is disabled. If the eraser feature is disabled, the processing module 56 receives raw log information 46 from the data store 34 and filters 48 the raw log information 46 to produce clean log information 50. The clean log information 50 is further processed 88 by ranking, scoring, correlating data, or additional filtering. The eraser feature can be disabled by the user selecting a disable button or if the Eraser cookie is deleted or removed from the client computer system 26. Moreover, if the eraser feature is disabled, the eraser module 32 is deactivated and does not identify certain raw log information 46 to be deleted.

In the processing module 56, the clean log information 50 is correlated to obtain additional information according to Query-to-Pick history data. The additional information can be based on user pick patterns or user query search patterns. Query-to-Pick history data refers to the correlation between a query entered by a user and the URL picked by the user. According to the Query-to-Pick History, a raw score is assigned to each URL pick by any scoring method. The URL picks are ranked according to the raw score and stored in the data source 38. The additional information can also include geographic location data, demographic data, and any relevant information related to the user as described in U.S. patent application Ser. No. 12/111,065 and U.S. application Ser. No. 10/853,552, which are herein incorporated by reference.

Figure 4:
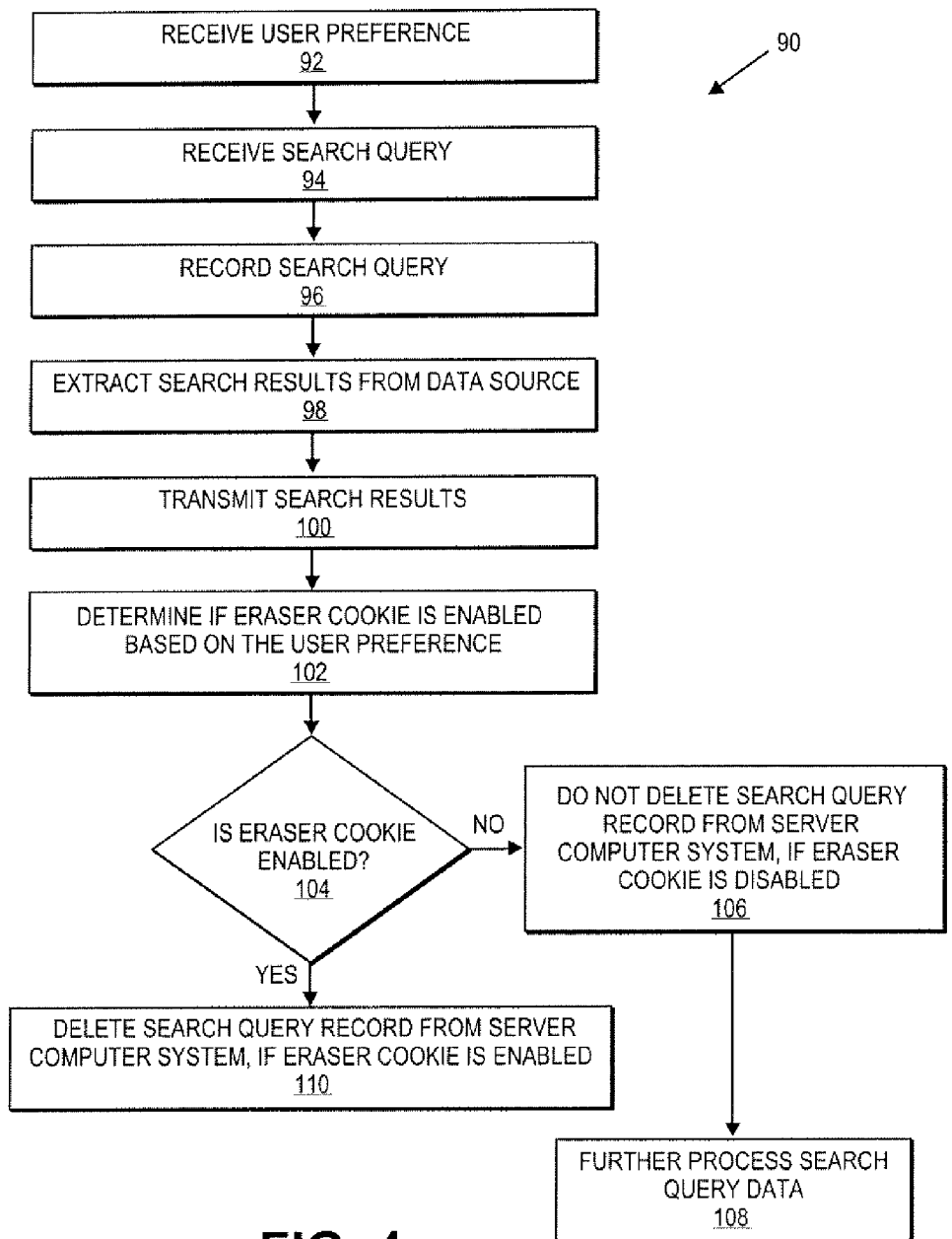
FIG. 4 is a flowchart illustrating a search query erasing method.

FIG. 4 illustrates various data processing system 20 operations that occur when the search activity data 22 is a search query 52 instead of pick data. The server computer system 24 receives a user preference via a cookie 58 through the network 28 at the receiving module 30. In addition, the server computer system 24 also receives the search query 52 over the network 28 at the receiving module 30. The search query 52 is recorded 96 at the data store 34 as raw log information 46. The search query 52 is also received at a search engine 36. The search engine 36 accesses the data source 38 containing search results 54 to extract 98 a corresponding search result 54 in response to the search query 52. The search results 54 are forwarded to a transmission module 40 which transmits 100 the search results across the network 28 back to the client computer system 26.

FIG. 4 further illustrates the eraser module 32 determining 102,104 whether an eraser cookie 58 is enabled based on a user preference.

If the eraser cookie 58 is not enabled, the raw log information 46 containing search query 52 related data is retained 106 on the data store 34. The search query 52 related data is further processed 108 by the processing module 56 and filtered 48 to produce clean log information 50, as previously described. The search query 52 related data can be correlated or associated with the pick or selection information, as already described. The correlations or associations between query and pick data are stored on the data source 38 for access by the search engine 36.

FIG. 4 further shows that if the eraser cookie 58 is enabled, the determining module 42 will determine that the eraser cookie 58 is enabled and the deleting module 44 will delete 110 the identified search query 52 related data from the data store 34. As previously described, search query 52 data may be retained indefinitely for various exceptions. Moreover, all other cookies (other than the eraser cookie) received from the server computer system 24 will be erased when the eraser cookie is enabled.

Figure 5:
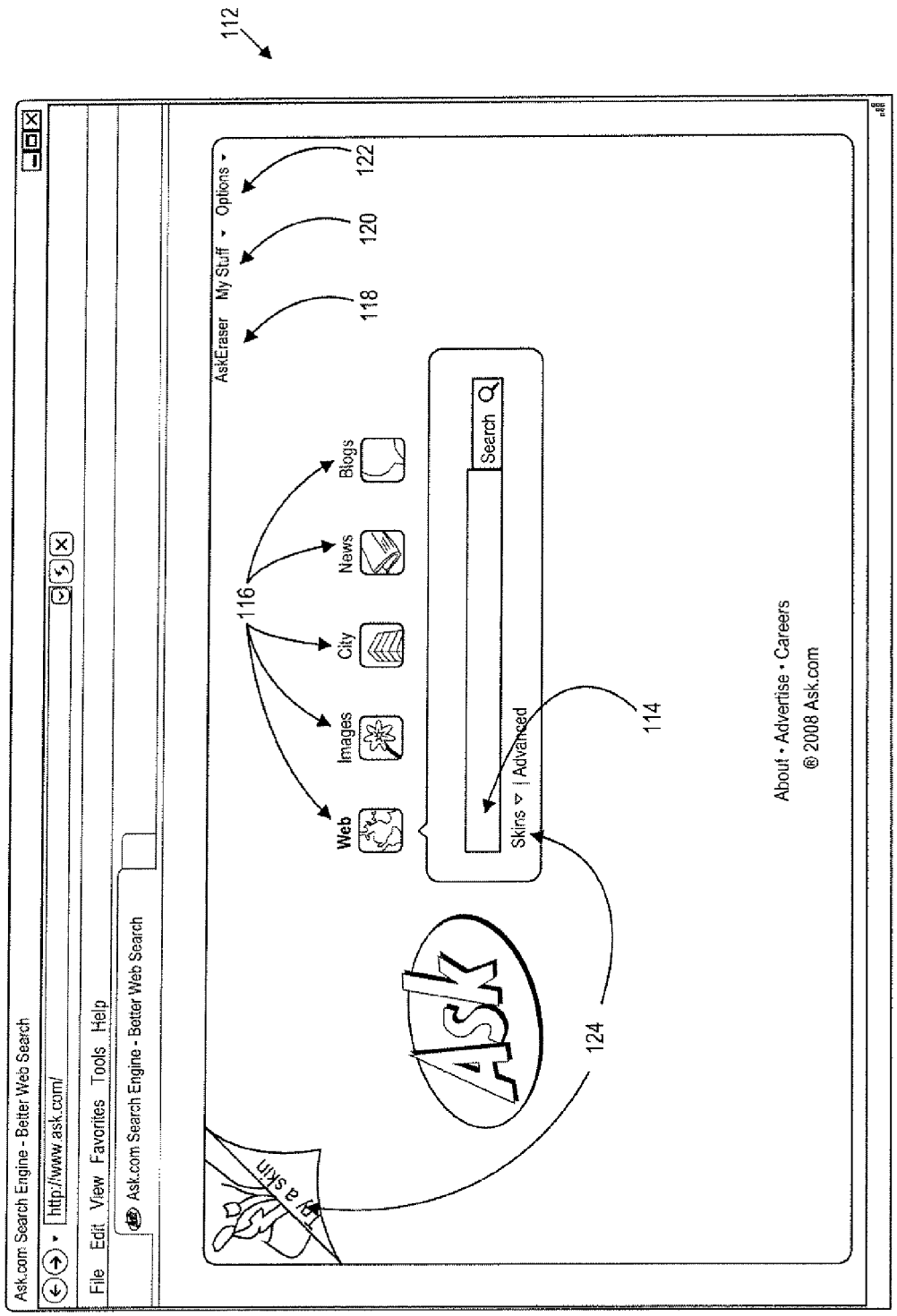
FIG. 5 is a screenshot of a user interface having an eraser feature.

FIG. 5 illustrates a screenshot of an exemplary web page 112 including a query input field 114, search verticals 116, a selectable eraser option 118, a personal folder drop down menu 120, an options drop down menu 122, and a skin selector 124.

A user can enter a query search term 52 into the query input field 114. Upon selecting the search button or entering a command to accept the search, search results 54 will be provided to the user based on the vertical 116 selected. FIG. 5 shows a "Web" search vertical 116 being selected within which a search query 52 is conducted. In one example, the search verticals 116 include Web, Images, News, Blogs, Video, Maps & Directions, City, and Shopping. The eraser feature will remain "on" across all verticals. For example, when a user clicks on the "City" vertical to find a business located in a specific location, the search activity data 22 will continue to be deleted from the server computer system 24 associated with the web page.

However, before searching and choosing picks within a vertical 116, a user has the option of selecting the eraser option 118 within the web page 112. If the user does not select the eraser option 118, the search terms and picks or clicks received from the user will be recorded on the server computer system 24 as a default operation.

Figure 6:
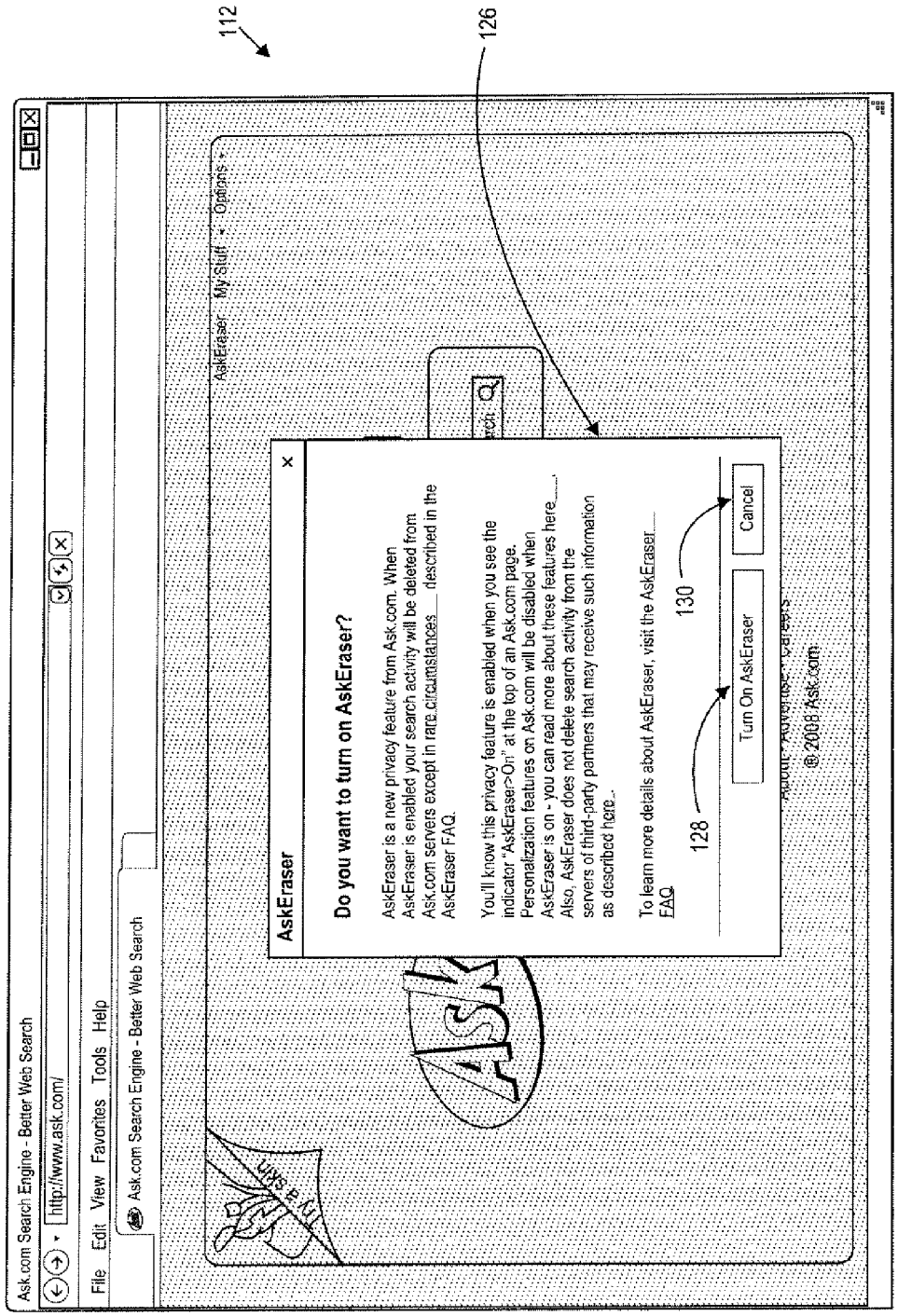
FIG. 6 is a screenshot of a dialog window related to the eraser feature.

FIG. 6 illustrates a screenshot after the user selects the eraser option 118. Upon the selection of the eraser option 118, a dialog box 126 appears within the webpage 112. The dialog window 126 appears within the webpage 112 requesting confirmation that the user would like to enable the eraser feature along with a brief description of the eraser feature. The dialog window 126 has a first button 128 that the user can select to enable the eraser feature. The dialog window 126 also contains a cancel button 130 that the user can select to avoid enabling the eraser feature.

Figure 7:
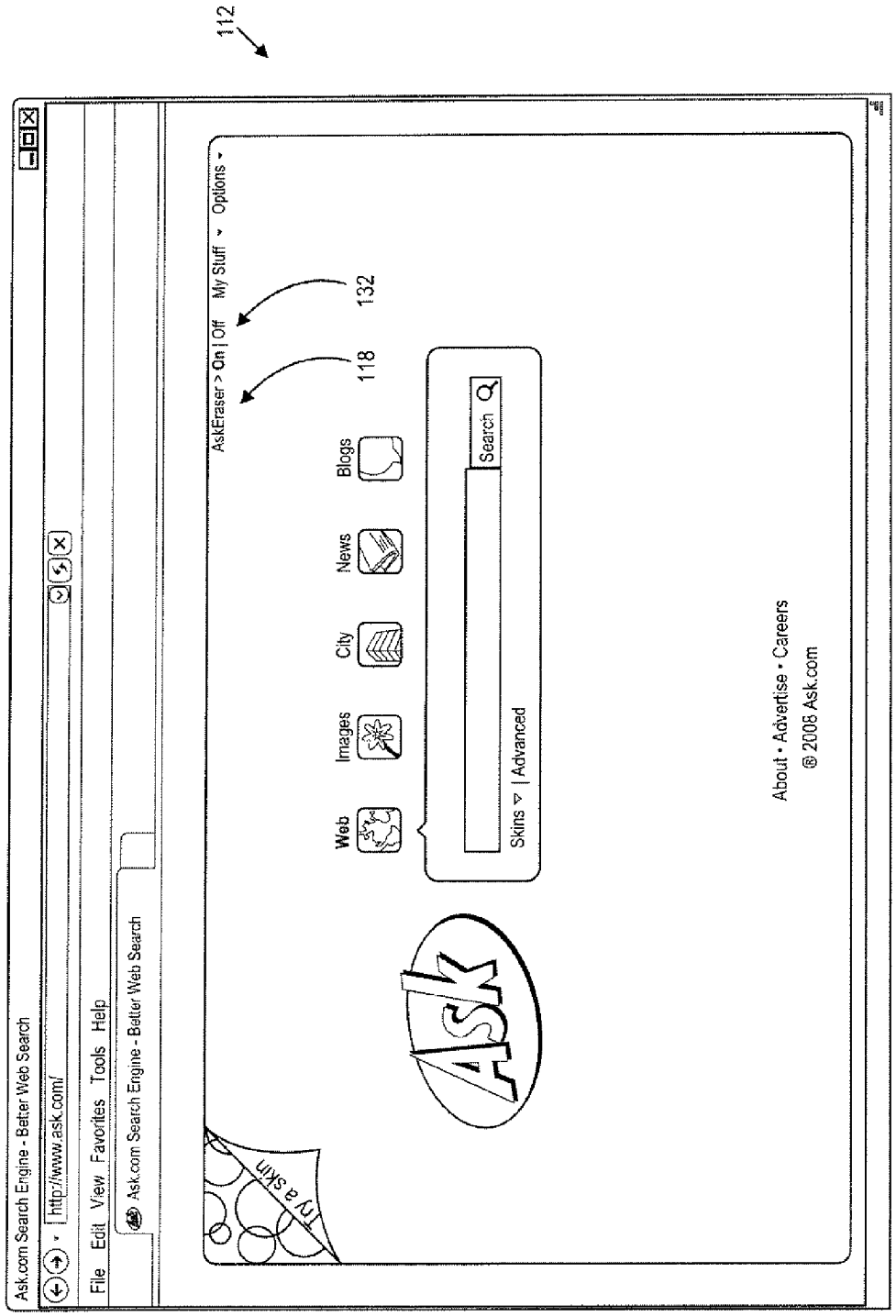
FIG. 7 is a screenshot of a user interface having the eraser feature activated.

FIG. 7 shows a screenshot of a web page 112 after the user has enabled the eraser feature. When the eraser feature is enabled, two status identifiers 132 appear next to the eraser option 118. A first status identifier displays a text "on" while a second status identifier displays a text "off". The "on" text is highlighted when the eraser feature is enabled. The status identifiers clearly and constantly indicate to the user whether search activity data 22 will be recorded on the server computer system 24.

It is understood that a user may close the web browser containing the web page or visit another web page. However, if the eraser feature is enabled, when the user returns to the web page associated with the server computer system 24, the eraser feature will remain enabled and the status identifier 132 will still highlight the "on" option. As long as the eraser feature is enabled through the Eraser cookie, the status identifier will remain "on" for subsequent user visits to an associated web page.

Figure 8:
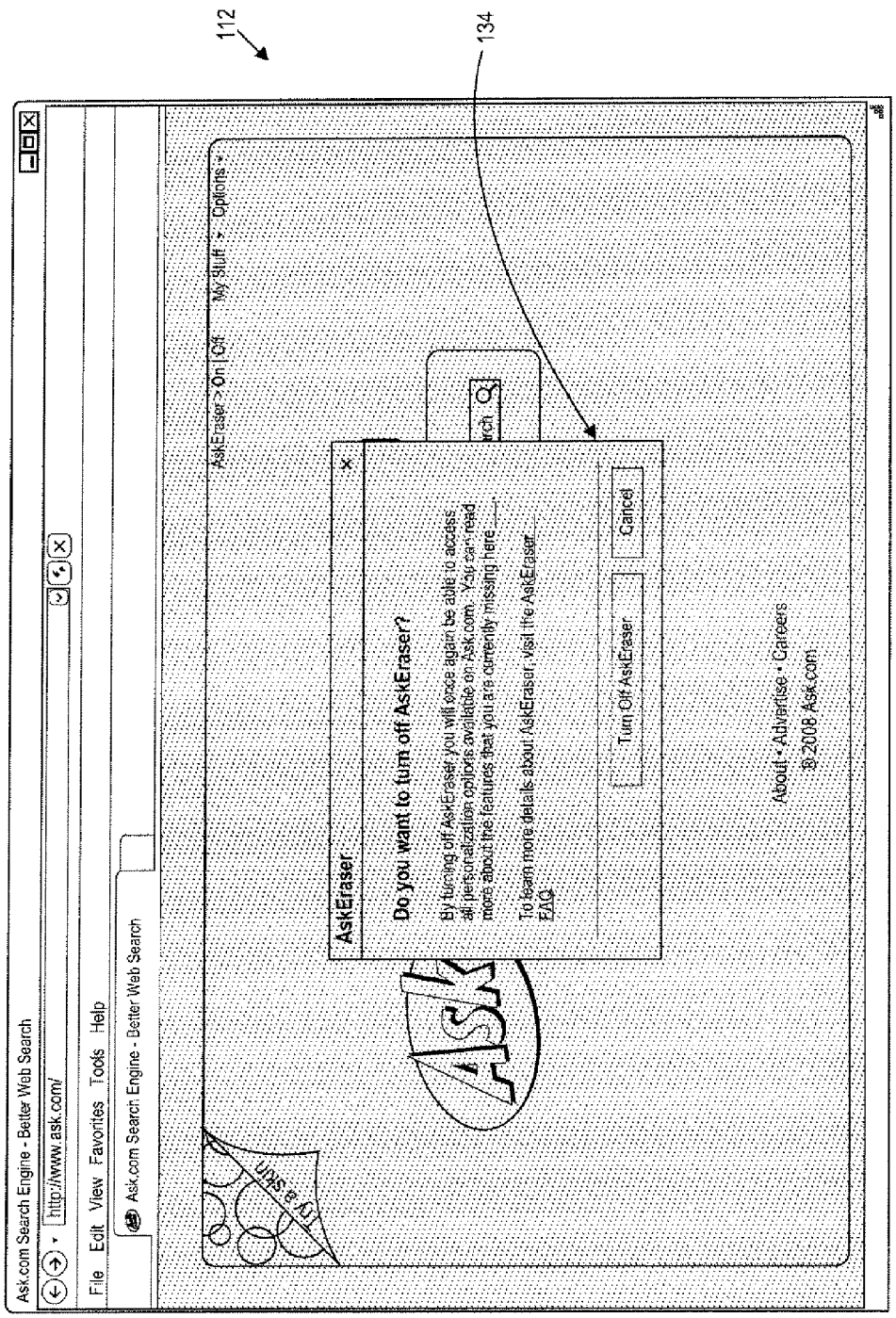
FIG. 8 is a screenshot of a dialog window related to the eraser feature.

FIG. 8 shows a screenshot when a user selects the "off" status identifier when the eraser feature is already enabled. Another dialog window 134 appears confirming whether the user would like to deactivate the eraser feature. It is understood that upon selecting the "off" status identifier, the web page may simply turn off the eraser feature without the use of a dialog window.

Figure 9:
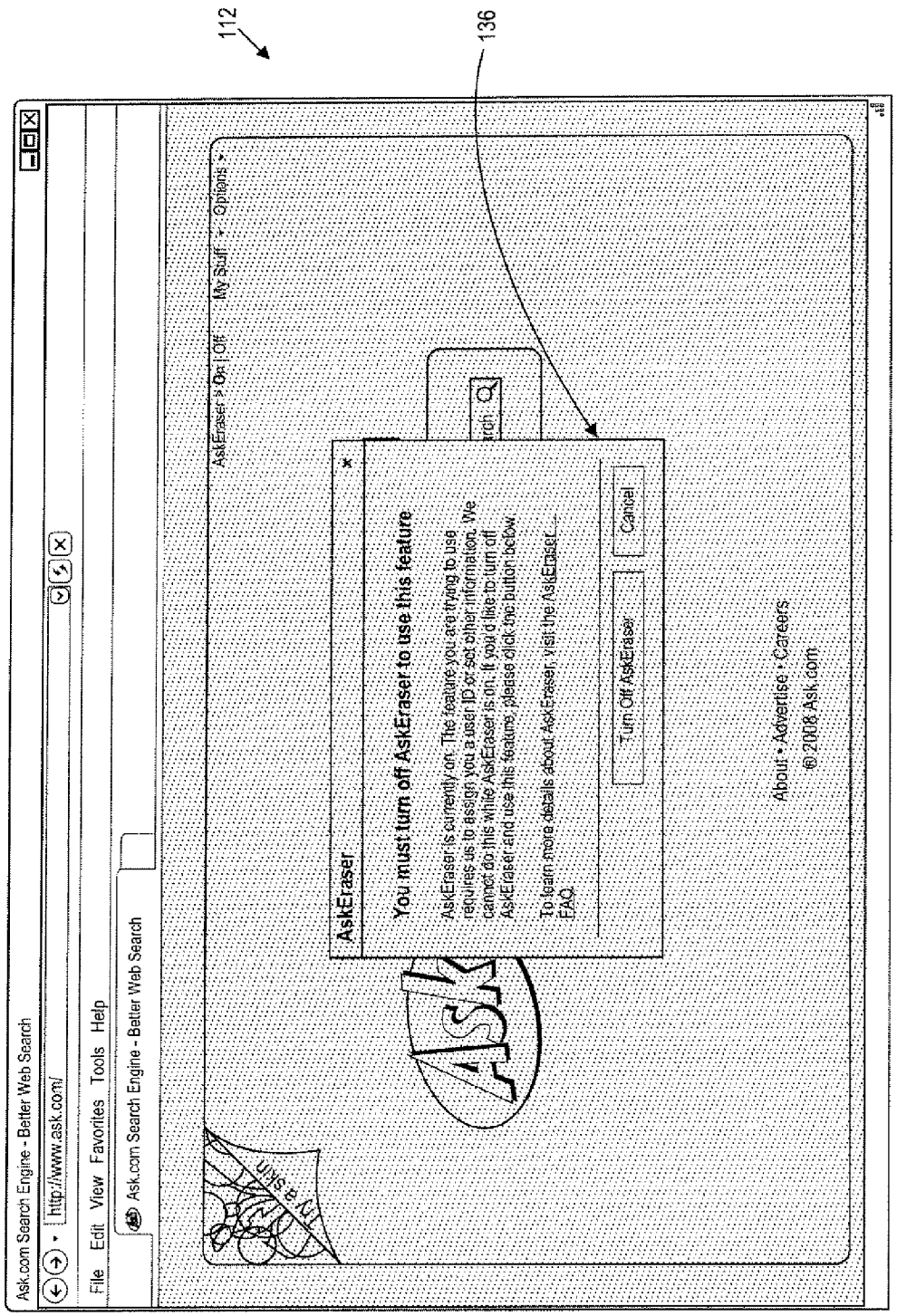
FIG. 9 is a screenshot of a dialog window related to the eraser feature.

FIG. 9 shows a screen shot when a user has the eraser feature enabled and the "on" status identifier is highlighted. However, the user has selected the personal folder drop down menu 120 or the options drop down menu 122. Because the personal folder feature and the options feature require a user ID or other information to be associated with the user, the eraser feature cannot be enabled during the use of these features and a dialog window 136 appears. Similarly, if a user selects the skin selector 124 (which changes the aesthetic characteristics of the web page) while the eraser feature is enabled, the same dialog window 136 will appear as described above because a skin preference requires the placement of a cookie on the client computer system 26. However, as previously described, all other cookies from the server computer system 24 (other than the Eraser cookie) are not allowed on the client computer system 26 when the eraser feature is enabled. Thus, the dialog window 136 seeks to resolve the conflict between the enabled eraser feature and the user selection of an option in direct conflict with the enabled eraser feature.

Figure 10:
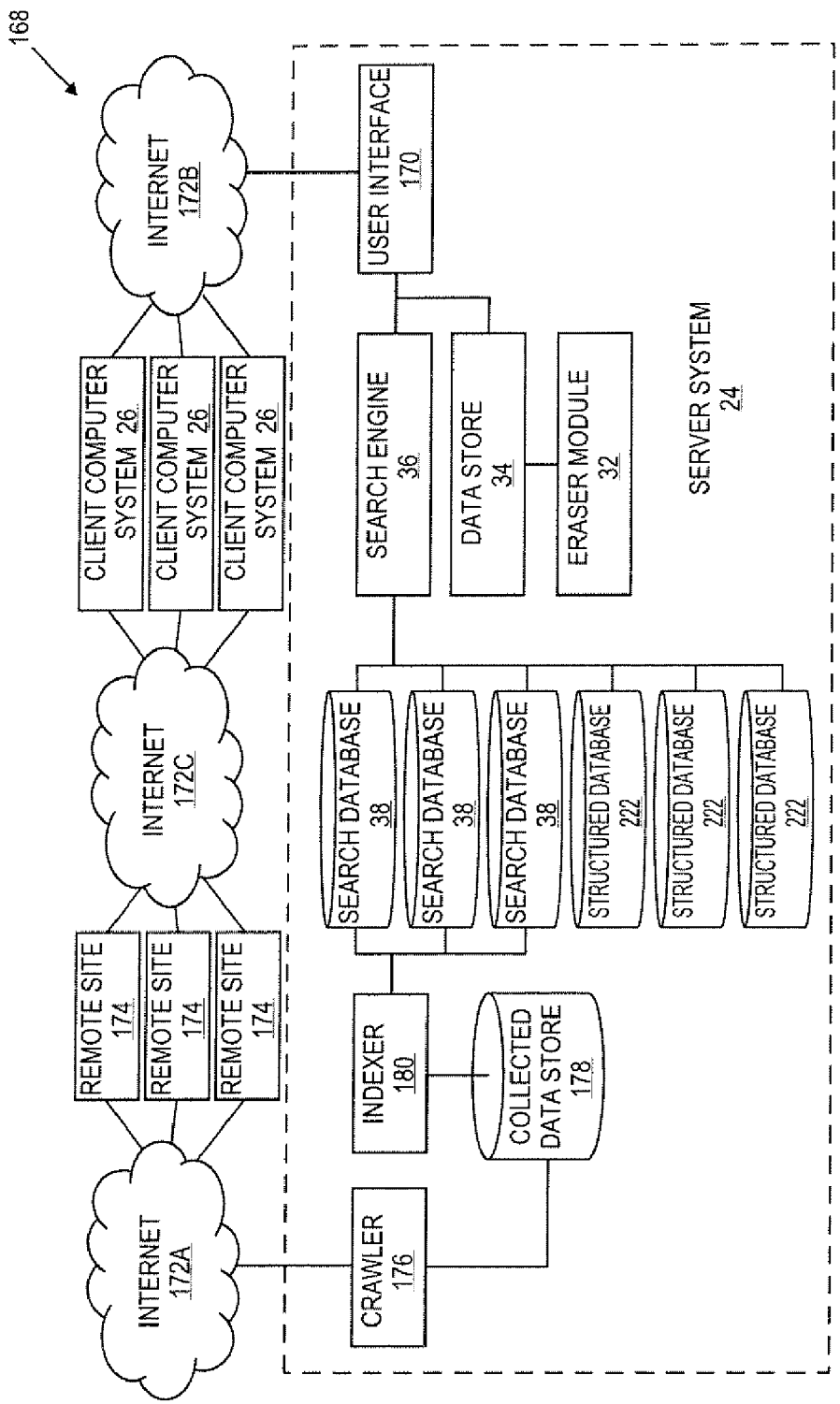
FIG. 10 is a block diagram of a network environment in which a user interface according to an embodiment of the invention may find application.

FIG. 10 of the accompanying drawings illustrates a network environment 168 that includes a user interface 170, according to an embodiment of the invention, including the internet 172A, 172B and 172C, a server computer system 24, a plurality of client computer systems 26, and a plurality of remote sites 174.

The server computer system 24 has stored thereon a crawler 176, a collected data store 178, an indexer 180, a plurality of search databases 36, a plurality of structured databases and data sources 222, a search engine 36, an eraser module 32, and the user interface 170. The novelty of the present invention revolves around the user interface 170, the search engine 36, the eraser module 32, data store 34, and one or more of the structured databases and data sources 222. The crawler 176 is connected over the internet 172A to the remote sites 174. The collected data store 178 is connected to the crawler 176, and the indexer 180 is connected to the collected data store 178. The search databases 38 are connected to the indexer 180. The search engine 36 and geo-bias system 38 are connected to the search databases 38 and the structured databases and data sources 222. The client computer systems 26 are located at respective client sites and are connected over the internet 172B and the user interface 170 to the search engine 36, data store 34 and eraser module 32.

Figure 11:
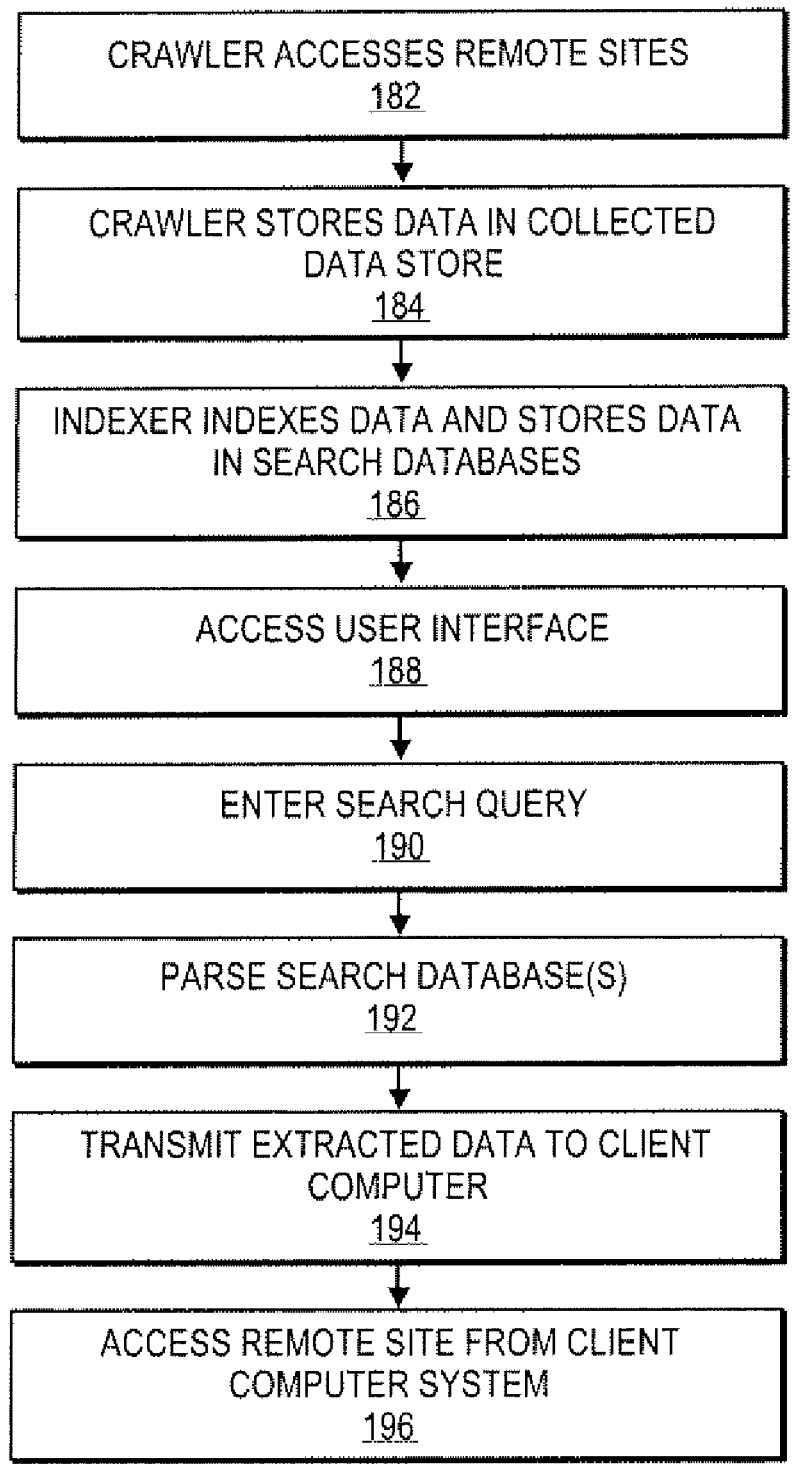
FIG. 11 is a flowchart illustrating how the network environment is used to search and find information.

Reference is now made to FIGS. 10 and 11 in combination to describe the functioning of the network environment 168. The crawler 176 periodically accesses the remote sites 174 over the internet 172A (step 182). The crawler 176 collects data from the remote sites 174 and stores the data in the collected data store 178 (step 184). The indexer 180 indexes the data in the collected data store 178 and stores the indexed data in the search databases 38 (step 186). The search databases 38 may, for example, be a "Web" database, a "News" database, a "Blogs & Feeds" database, an "Images" database, etc. The structured databases or data sources 222 are licensed from third party providers and may, for example, include an encyclopedia, a dictionary, maps, a movies database, etc.

A user at one of the client computer systems 26 accesses the user interface 170 over the internet 172B (step 188). The user can enter a search query in a search box in the user interface 170, and either hit "Enter" on a keyboard or select a "Search" button or a "Go" button of the user interface 170 (step 190). The search engine 36 then uses the "Search" query to parse the search databases 38 or the structured databases or data sources 222. In the example of where a "Web" search is conducted, the search engine 36 parses the search database 38 having general Internet Web data (step 192). Various technologies exist for comparing or using a search query to extract data from databases, as will be understood by a person skilled in the art.

The search engine 36 then transmits the extracted data over the internet 172B to the client computer system 26 (step 194). The extracted data includes URL links to one or more of the remote sites 174. The user at the client computer system 26 can select one of the links to the remote sites 174 and access the respective remote site 174 over the internet 172C (step 196). The server computer system 24 has thus assisted the user at the respective client computer system 26 to find or select one of the remote sites 174 that have data pertaining to the query entered by the user.

Figure 12:
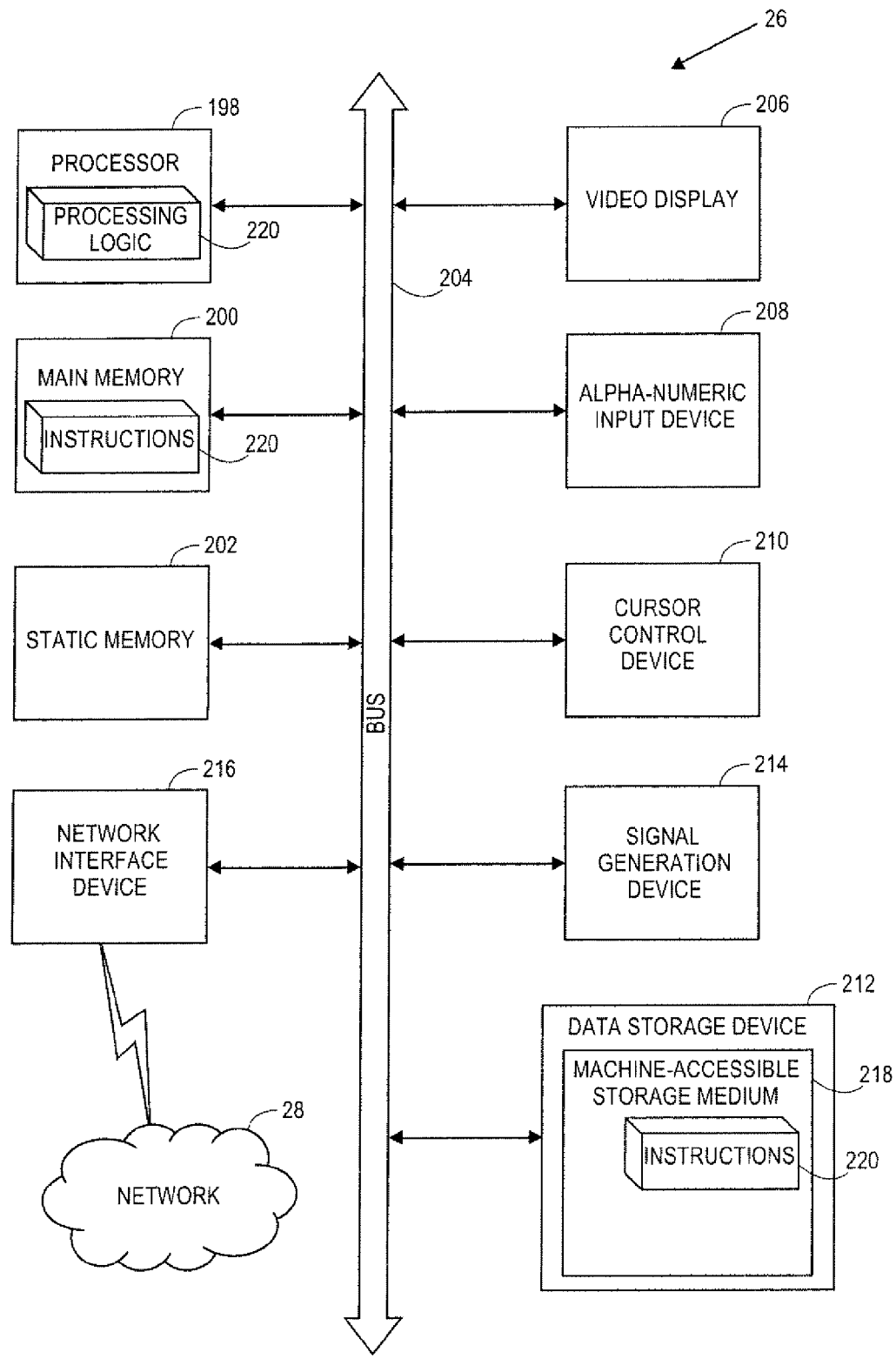
FIG. 12 is a block diagram of a client computer system forming area of the network environment, but may alternatively be a block diagram of a computer in a server computer system forming area of the network environment.

FIG. 12 shows a diagrammatic representation of a machine in the exemplary form of one of the client computer systems 26 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term (machine) shall be taken to include any collection of machines that individually or jointly execute a set (or multiple sets) of instructions to perform any one or more of the methodologies discussed herein. The server computer system 24 of FIG. 10 may include one or more machines as shown in FIG. 12.

The exemplary client computer system 26 includes a processor 198 (e.g., a central processing unit (CPU), a graphics processing unit (GPU), or both), a main memory 200 (e.g., read-only memory (ROM), flash memory, dynamic random access memory (DRAM) such as synchronous DRAM (SDRAM) or Rambus DRAM (RDRAM), etc.), and a static memory 202 (e.g., flash memory, static random access memory (SRAM), etc.), which communicate with each other via a bus 204.

The client computer system 26 may further include a video display 206 (e.g., a liquid crystal display (LCD) or a cathode ray tube (CRT)). The client computer system 26 includes an alpha-numeric input device 208 (e.g., a keyboard), a cursor control device 210 (e.g., a mouse), a disk drive unit 212, a signal generation device 214 (e.g., a speaker), and a network interface device 216.

The disk drive unit 212 includes a machine-readable medium 218 on which is stored one or more sets of instructions 220 (e.g., software) embodying any one or more of the methodologies or functions described herein. The software may reside, completely or at least partially, within the main memory 200 and/or within the processor 198 during execution thereof by the client computer system 26, the memory 200 and the processor 198 also constituting machine readable media. The software may further be transmitted or received over a network 28 via the network interface device 216.

While the instructions 220 are shown in an exemplary embodiment to be on a single medium, the term "machine readable medium" should be taken to understand a single medium or multiple media (e.g., a centralized or distributed database or data source and/or associated caches and servers) that store the one or more sets of instructions. The term "machine readable medium" shall be taken to include any storage medium that is capable of storing, encoding, or carrying a set of instructions for execution by the machine and that caused the machine to perform any one or more of the methodologies of the present invention. The term "machine readable medium" shall accordingly be taken to include, but not be limited to, solid-state memories, and optical and magnetic media.

It is understood that the eraser module 32 only erasers activity associated with the server computer system 24. Search activity related to the servers of third-party organizations that enable the server computer system 24 to provide users with certain types of search results (for example: videos, weather, shopping, and stock market summaries) are not deleted.

Furthermore, search or pick activity related to a third-party organization that enables the application of sponsored links or text-based ads are not deleted. The third party organizations would delete search activity in accordance with their own data retention policies.

Moreover, a third party organization may receive search query information related to a pick or click via "referrer data" when the eraser feature is enabled on the server computer system 24.

In an alternative embodiment, the eraser feature is enabled when a search is conducted within a search box that is embedded into an internet browser.

In an alternative embodiment, the eraser feature is disabled when a user search is performed through a search toolbar or search box available on a third-party website or third-party software that the user chooses to install on the client computer system 26.

In another alternative embodiment, the client computer system 26 receives from the server computer system 24 an additional cookie, in addition to the Eraser cookie.

In one alternative embodiment, the additional cookie is an unfiltered results cookie. The unfiltered results cookie allows the server computer system 24 to identify whether the user is capable of viewing unfiltered search results or has chosen an option for unfiltered results. When the user picks a link to view unfiltered results, a pop-up window is presented to request the user to accept the unfiltered results cookie (in addition to the Eraser cookie that may be activated on the client system). The unfiltered results cookie is a non-identifiable temporary cookie created by the server computer system 24 and will expire in 20 minutes. Unlike the Eraser cookie, subsequent user visits to the associated server web page still require a user to confirm that unfiltered results are desired. In other words, subsequent attempts by a user to retrieve unfiltered results will require the user to re-confirm a desire to view unfiltered search results.

One advantage of the present invention is that a user's privacy needs are met in the context of the search industry.

Another advantage is that the users have the power to control the usage of their search history and therefore provides users with a sense of security with respect to privacy concerns.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of data processing comprising:
receiving a user preference at a server computer system from a client computer over a network for enabling or disabling an erasure feature;
storing an eraser identification cookie on the client computer system that represents the user preference for an erasure feature, wherein the eraser feature indicates whether a search query record is to be deleted from the server computer system, wherein the eraser identification cookie is user modifiable to allow or prevent the deletion of the search query record from the server computer system;
storing an unfiltered results cookie, wherein the unfiltered results cookie identifies whether the user is capable of viewing unfiltered search results;
receiving a search query from the client computer at the server computer system over the network;
recording the search query at the server computer system to create a search query record;
extracting search results from a data store based on the query;
transmitting the search results from the server computer system to the client computer system, the search results depending on the unfiltered results cookie;
determining at the server computer system whether the erasure feature is enabled or disabled; and
automatically either deleting the search query record from the server computer system if the erasure feature is enabled, or not deleting the search query record on the server computer system if the search erasure feature is disabled.

2. The method of claim 1, wherein the search query record forms part of at least one search activity record that has at least one of an IP address, a user ID, a session ID cookie, and user pick data.

3. The method of claim 1, wherein the search query record is deleted from the server computer system before the search query record can be used to derive additional information.

4. The method of claim 3, wherein the additional information is information that is related to a user pick pattern or user search pattern.

5. The method of claim 1, wherein user provided personal information remains on the server computer system after the search query record is deleted from the server computer system.

6. A machine-readable storage medium that provides executable instructions which, when executed by a computer system, cause the computer system to perform a method comprising:
receiving a user preference at a server computer system from a client computer over a network for enabling or disabling an erasure feature;
storing an eraser identification cookie on the client computer system that represents the user preference for an erasure feature, wherein the eraser feature indicates whether a search query record is to be deleted from the server computer system, wherein the eraser identification cookie is user modifiable to allow or prevent the deletion of the search query record from the server computer system;

storing an unfiltered results cookie, wherein the unfiltered results cookie identifies whether the user is capable of viewing unfiltered search results;

receiving a search query from the client computer at the server computer system over the network;

recording the search query at the server computer system to create a search query record;

extracting search results from a data store based on the query;

transmitting the search results from the server computer system to the client computer system, the search results depending on the unfiltered results cookie;

determining at the server computer system whether the erasure feature is enabled or disabled; and automatically either deleting the search query record from the server computer system if the erasure feature is enabled, or not deleting the search query record on the server computer system if the search erasure feature is disabled.

7. The machine-readable storage medium of claim 6, wherein the search query record forms part of at least one search activity record that has at least one of an IP address, a user ID, a session ID cookie, and user pick data.

8. The machine-readable storage medium of claim 6, wherein the search query record is deleted from the server computer system before the query record can be used to derive additional information.

9. The machine-readable storage medium of claim 8, wherein the additional information is information that is related to a user pick pattern or user search pattern.

10. The machine-readable storage medium of claim 6, wherein user provided personal information remains on the server computer system after the search query record is deleted from the server computer system.

11. A server computer system comprising:
a processor;
a data store connected to the processor;
a computer-readable medium connected to the processor;
a set of instructions on the computer-readable medium, the instructions being executable by the processor to execute the following steps:
receiving a user preference at a server computer system from a client computer over a network for enabling or disabling an erasure feature;
storing an eraser identification cookie on the client computer system that represents the user preference for an erasure feature, wherein the eraser feature indicates whether a search query record is to be deleted from the server computer system, wherein the eraser identification cookie is user modifiable to allow or prevent the deletion of the search query record from the server computer system;
storing an unfiltered results cookie, wherein the unfiltered results cookie identifies whether the user is capable of viewing unfiltered search results;
receiving a search query from the client computer at the server computer system over the network;
recording the search query at the server computer system to create a search query record;
extracting search results from a data store based on the query;
transmitting the search results from the server computer system to the client computer system, the search results depending on the unfiltered results cookie;
determining at the server computer system whether the erasure feature is enabled or disabled; and
automatically either deleting the search query record from the server computer system if the erasure feature is enabled, or not deleting the search query record on the server computer system if the search erasure feature is disabled.

* * * * *